United States Patent
Kim et al.

(10) Patent No.: US 11,091,387 B2
(45) Date of Patent: Aug. 17, 2021

(54) GLASS COMPOSITION AND COOKING APPLIANCE

(71) Applicant: LG ELECTRONICS INC., Seoul (KR)

(72) Inventors: Namjin Kim, Seoul (KR); Youngseok Kim, Seoul (KR); Yunsung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/478,501

(22) PCT Filed: Feb. 1, 2018

(86) PCT No.: PCT/KR2018/001404
§ 371 (c)(1),
(2) Date: Jul. 17, 2019

(87) PCT Pub. No.: WO2018/143704
PCT Pub. Date: Aug. 9, 2018

(65) Prior Publication Data
US 2019/0337837 A1    Nov. 7, 2019

(30) Foreign Application Priority Data

Feb. 2, 2017  (KR) .................. 10-2017-0014831

(51) Int. Cl.
*C03C 8/08* (2006.01)
*C03C 8/04* (2006.01)
(Continued)

(52) U.S. Cl.
CPC ............... *C03C 8/08* (2013.01); *C03C 3/04* (2013.01); *C03C 8/04* (2013.01); *C03C 8/20* (2013.01);
(Continued)

(58) Field of Classification Search
CPC ............... C03C 8/04; C03C 8/08; C03C 8/20
See application file for complete search history.

(56) References Cited

U.S. PATENT DOCUMENTS 5,886,329 A   3/1999  Kim
5,993,974 A   11/1999 Fukushima et al.
(Continued)

FOREIGN PATENT DOCUMENTS

CN   101066840   11/2007
CN   100540492   9/2009
(Continued)

OTHER PUBLICATIONS

European Search Report dated Oct. 16, 2020 issued in Application No. 18748426.6.
(Continued)

*Primary Examiner* — Karl E Group
(74) *Attorney, Agent, or Firm* — Ked & Associates LLP (57) ABSTRACT

Provided is a glass composition comprising a glass frit containing $P_2O_5$, BaO, ZnO, group I-based oxide and group II-based oxide, wherein the $P_2O_5$ is contained in an amount of 20 wt % to 55 wt % based on a total weight of the glass frit, wherein each of the BaO and ZnO is contained in an amount of 2 to 30% by weight based on the total weight of the glass frit, wherein the group I-based oxide is contained in an amount of 5 to 20% by weight based on the total weight of the glass frit, wherein the group II-based oxide is contained in an amount of 1 to 15% by weight based on the total weight of the glass frit.

3 Claims, 3 Drawing Sheets

(51) Int. Cl.
*C03C 8/20* (2006.01)
*C03C 3/066* (2006.01)
*C03C 3/04* (2006.01)
*F24C 15/00* (2006.01)

(52) U.S. Cl.
CPC .......... *F24C 15/00* (2013.01); *C03C 2201/10* (2013.01); *C03C 2201/50* (2013.01); *C03C 2201/54* (2013.01); *C03C 2217/217* (2013.01); *C03C 2218/112* (2013.01)

(56) References Cited

U.S. PATENT DOCUMENTS

| | | | |
|---|---|---|---|
| 8,410,404 | B2 | 4/2013 | Baek et al. |
| 9,072,400 | B2 | 7/2015 | Benford, Jr. et al. |
| 9,296,642 | B2 | 3/2016 | Lee et al. |
| 9,296,643 | B2 | 3/2016 | Kim et al. |
| 9,302,932 | B2 | 4/2016 | Kim et al. |
| 10,427,973 | B2 | 10/2019 | Gorecki et al. |
| 10,647,609 | B2 * | 5/2020 | Choi ................ F27D 1/0003 |
| 2011/0049122 | A1 | 3/2011 | Baek et al. |
| 2013/0299482 | A1 | 11/2013 | Kim et al. |
| 2018/0215655 | A1 | 8/2018 | Kim et al. |

FOREIGN PATENT DOCUMENTS

| | | |
|---|---|---|
| CN | 105948495 | 9/2016 |
| EP | 0 887 593 | 12/1998 |
| EP | 2 662 340 | 11/2013 |
| EP | 3 357 876 | 8/2018 |
| EP | 3495330 | 6/2019 |
| JP | S56-114875 | 9/1981 |
| JP | S61-295257 | 12/1986 |
| JP | H11-139847 | 5/1999 |
| JP | 2001-031446 | 2/2001 |
| JP | 2005-256078 | 9/2005 |
| JP | 2007-031780 | 2/2007 |
| JP | 2016-222473 | 12/2016 |
| KR | 10-2009-0130668 | 12/2009 |
| KR | 10-2011-0023079 | 3/2011 |
| KR | 10-2013-0125918 | 11/2013 |
| KR | 10-2014-0074246 | 6/2014 |
| KR | 10-2014-0115562 | 10/2014 |
| KR | 10-2017-0054132 | 5/2017 |
| SU | 1599324 | 10/1990 |

OTHER PUBLICATIONS

International Search Report (with English Translation) dated May 9, 2018 and Written Opinion dated May 4, 2018 issued in Application No. PCT/KR2018/001404.

* cited by examiner

GLASS COMPOSITION AND COOKING APPLIANCE

CROSS-REFERENCE TO RELATED PATENT APPLICATIONS

This application is a U.S. National Stage Application under 35 U.S.C. § 371 of PCT Application No. PCT/KR2018/001404, filed Feb. 1, 2018, which claims priority to Korean Patent Application No, 10-2017-0014831, filed Feb. 2, 2017, whose entire disclosures are hereby incorporated by reference.

TECHNICAL FIELD

Embodiments relates to a glass composition, and a cooking appliance including the composition.

BACKGROUND ART

Enamel refers to a glass glaze coated on a surface of a metal plate. Enamel is typically used for cooking appliances. Such as microwave ovens and ovens. Enamel may be classified as an oxidation-resistant enamel which can prevent oxidation, or a heat-resistant enamel which can withstand high temperature, depending on the kind or use of glaze. Depending on the material added into the enamel, enamel may be classified into aluminum enamel, zirconium enamel, titanium enamel, and soda glass enamel.

In general, a cooking appliance refers to a device that heats and cooks food using a heating source. The food waste generated in the cooking process contacts the inner wall of the cavity portion of the cooking appliance. Therefore, when the food is cooked in the cooking appliance, it is necessary to clean the inside of the cavity portion. In addition, because cooking generally involves high temperature, the inner wall of the cavity portion may be exposed to the organic substance and the alkali ingredient. Therefore, when enamel is used therein, such enamel requires heat resistance, chemical resistance, abrasion resistance, and contamination resistance. Therefore, there is a need for a composition for enamel for improving the heat resistance, chemical resistance, abrasion resistance, and contamination resistance of enamel.

Particularly, in order to easily clean the enamel used in the oven, a pyrolysis method of burning contaminants at high temperature, a method of using a strong alkaline detergent, or a water soaking may be used. Accordingly, because the enamel is exposed to a high-temperature or high-alkali detergent, the enamel requires high heat resistance and chemical resistance.

DISCLOSURE

Technical Purpose

Embodiments provide a glass composition with improved cleaning performance and improved reliability, and a cooking appliance using the same.

Technical Solution

In one aspect, there is provided a glass composition comprising a glass frit containing $P_2O_5$, BaO, ZnO, group I-based oxide and group II-based oxide, wherein the $P_2O_5$ is contained in an amount of 20 wt % to 55 wt % based on a total weight of the glass frit, wherein each of the BaO and ZnO is contained in an amount of 2 to 30% by weight based on the total weight of the glass frit, wherein the group I-based oxide is contained in an amount of 5 to 20% by weight based on the total weight of the glass frit, wherein the group II-based oxide is contained in an amount of 1 to 15% by weight based on the total weight of the glass frit.

Technical Effect

According to the present disclosure, the glass composition may have improved cleanability.

Accordingly, the cleaning of the cooking appliance may be improved. In detail, the cooking appliance can be easily cleaned only with water-soaking.

That is, although the inner face of the door and the inner face of the cavity portion are contaminated by food and organic substances generated during the cooking process while the cooking space defined in the cavity portion of the cooking appliance is closed, the inner face of the door and the inner face of the cavity portion may be easily cleaned only with the water-soaking.

Further, contaminants including oil, such as chicken oil, and sugars can be effectively removed with less energy and less time, from the functional layer coated using the glass composition according to the embodiment.

Further, since the functional layer coated using the glass composition according to the embodiment is excellent in cleaning property, the interior of the cooking appliance can be easily cleaned even with a small energy.

Further, since the glass composition according to the embodiment has a softening point and thermal expansion coefficient higher than a certain temperature, the function face may withstand cooking and washing at a high temperature for a long time.

DETAILED DESCRIPTIONS

Hereinafter, a glass composition according to an embodiment and a cooking appliance including the same will be described with reference to the drawings.

Of the terms described below, adherence may be defined as the pre-firing coatability of the glass composition, and adhesion may be defined as post-firing coatability thereof.

Figure 1:
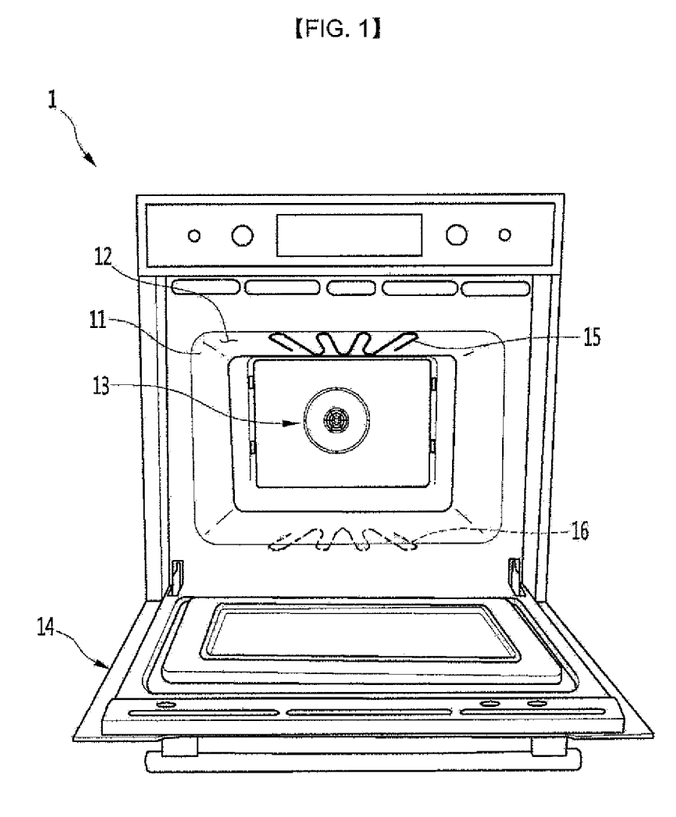
FIG. 1 is a front view of a cooking appliance according to an embodiment.

FIG. 1 is a front view of a cooking appliance according to an embodiment.

Referring to FIG. 1, a cooking device or appliance 1 may include a cavity portion 11 having a cooking space 12 defined therein; a door 14 configured to selectively open and close the cooking space 12; and at least one heat source configured to supply heat for heating food to be cooked within the cooking space 12.

In detail, the cavity portion 11 may be formed in a hexahedral shape with the front face opened. The heat source includes the following components: a convection assembly 13 for discharging heated air into the cavity in the cavity portion 11, an upper heater 15 disposed on the upper inner face oof the cavity portion 11, and a lower heater 16 disposed on a lower inner face of the cavity portion 11. Of course, the heat source does not necessarily have to include all of the convection assembly 13, the upper heater 15 and the lower heater 16. That is, the heat source may include at least one of the convection assembly 13, the upper heater 15, and the lower heater 16.

The upper heater 15 and/or the lower heater 16 may be provided inside or outside the cavity of the cavity portion 11.

Referring to FIG. 2 to FIG. 5, a functional layer may be disposed on the inner face of the cavity portion 11 and/or on the inner face of the door 14.

The functional layer may comprise a glass composition as described below. The functional layer may be coated on the inner face of the cavity portion 11 and/or the inner face of the door 14. That is, the functional layer may be a coating layer.

The functional layer can improve the heat resistance, chemical resistance and stain resistance of the inner face of the cavity portion 11 and the inner face of the door 14.

Figure 2:
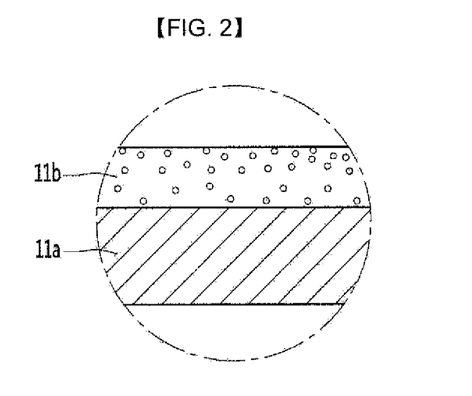
FIG. 2 and FIG. 3 are enlarged cross-sectional views of a portion of the inner face of the cavity portion of FIG. 1
Figure 3:
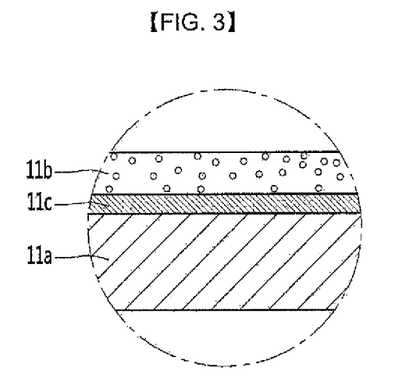

Referring to FIGS. 2 and 3, the functional layer may be disposed on the cavity portion.

The cavity portion 11 may include a metal layer 11a, and a functional layer 11b on the metal layer 11a.

The metal layer 11a may be the base of the cavity portion.

Referring to FIG. 2, the functional layer 11b may be disposed in direct contact with the metal layer 11a.

Alternatively, referring to FIG. 3, the functional layer 11b may be in indirect contact with the metal layer 11a. In detail, a buffer layer 11c may be disposed between the metal layer 11a and the functional layer 11b. The buffer layer 11c may comprise an adhesive layer. That is, by the buffer layer 11c, the adhesion between the metal layer 11a and the functional layer 11b can be improved.

Figure 4:
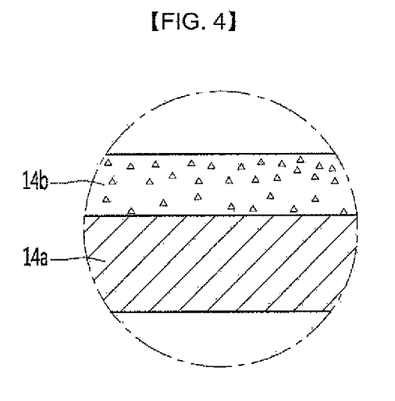
FIG. 4 and FIG. 5 are enlarged views of a portion of the inner face of the door of FIG. 1.
Figure 5:
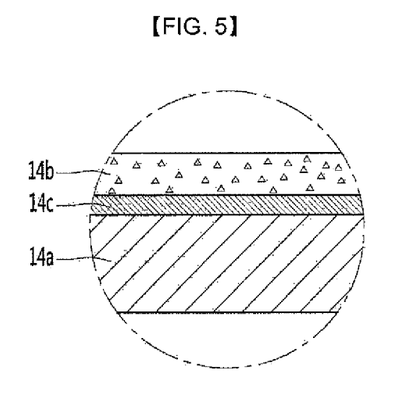

Referring to FIGS. 4 and 5, the functional layer may be disposed on the inner face of the door 14. In detail, the functional layer may be disposed on the inner face of the door 14 facing the cooking space 12 with the cooking space 12 being closed. The functional layer can improve the heat resistance, chemical resistance and stain resistance of the inner face of the door 14.

The door 14 may include a metal layer 14a, and a functional layer 14b on the metal layer 14a.

The metal layer 14a may be the base of the cavity portion.

Referring to FIG. 4, the functional layer 14b may be disposed in direct contact with the metal layer 14a.

Alternatively, referring to FIG. 5, the functional layer 14b may be disposed in indirect contact with the metal layer 14a. In detail, a buffer layer 14c may be disposed between the metal layer 14a and the functional layer 14b. The buffer layer 14c may comprise an adhesive layer. That is, the adhesion between the metal layer 14a and the functional layer 14b can be improved by the buffer layer 14c.

The functional layer may be formed by coating the glass composition on the inner face of the cavity portion 11 or on the inner face of the door 14. In detail, the functional layer is coated on the inner face of the cavity portion 12 and on the inner face of the door 14 so that the inner face of the cavity portion 12 and the inner face of the door 14 have enhanced heat resistance, chemical resistance and stain resistance.

Hereinafter, the glass composition coated on the inner faces of the cavity portion and door of the cooking appliance will be described. The glass composition may be an enamel composition.

The glass composition according to the embodiment may include glass frit including $P_2O_5$, BaO, ZnO, group I-based oxide and group II-based oxide.

The $P_2O_5$ may be contained in at up to about 55 wt % based on the total weight of the glass frit. Specifically, the $P_2O_5$ may be present in an amount of about 20 wt % to about 55 wt % based on the total weight of the glass frit. More specifically, the $P_2O_5$ may be present in an amount from about 25 wt % to about 50 wt % based on the total weight of the glass frit.

Figure 6:
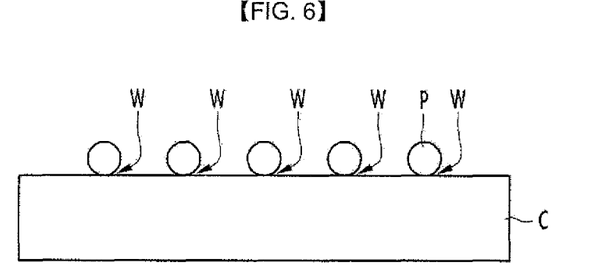
FIG. 6 is a view for illustrating that contaminants are removed from the coating layer.

The $P_2O_5$ may be included in the glass composition to improve cleanability of the. Further, the $P_2O_5$ may be included in the glass composition to improve the hydrophilicity of the. Accordingly, as shown in FIG. 6, due to the presence of $P_2O_5$, the coating layer C containing the glass composition is hydrophilic. Thus, after water-soaking, water W can effectively penetrate the interface between the coating layer C and the contaminants P on the coating layer C, and the contaminants can be easily removed from the coating layer C.

If the $P_2O_5$ is included in a content smaller than about 20% by total weight of the glass composition, cleaning performance of the glass composition may be degraded. In detail, when the $P_2O_5$ is included in a content smaller than about 20% by total weight of the glass composition, the removal characteristics of contaminants such as chicken oil or saccharides may be deteriorated. If the $P_2O_5$ is included in a content larger than about 55% by total weight of the glass composition, the thermal properties of the glass composition may be degraded, the vitrification of the glass composition may be weakened, and the adhesion of the glass composition may be deteriorated.

The group I-based oxide includes at least one metal oxide selected from a group consisting of $Na_2O$ and $K_2O$. Specifically, the group I-based oxide may include $Na_2O$ and $K_2O$. That, the glass frit may contain all of $Na_2O$ and $K_2O$.

The group I-based oxide may be contained up to about 20 wt % based on the total weight of the glass frit. Specifically, the group I-based oxide may be contained at from about 5 wt % to about 20 wt % based on the total weight of the glass frit. More specifically, the group I-based oxide may be contained at from about 10 wt % to about 15 wt % based on the total weight of the glass frit.

The group I-based oxide may be included in the glass composition to improve the cleanability and durability of the glass composition and reduce the melting temperature.

That is, the group I-based oxide can improve the cleanability of the glass composition together with the $P_2O_5$. For example, $Na_2O$ and $K_2O$ may be incorporated in the glass composition to improve the cleanability of the glass composition. Further, $Li_2O$ may be incorporated in the glass composition to improve the durability of the functional layer.

If the group I-based oxide is contained at less than about 7 wt % based on the total weight of the glass frit, the cleanability and durability of the glass composition may be degraded. Further, when the group I-based oxide is contained in an amount exceeding about 28 wt % based on the total weight of the glass frit, the thermal properties of the glass composition may be deteriorated and the vitrification may not be achieved.

$P_2O_5$, $Na_2$, $K_2O$, and $Li_2O$ may form an alkali phosphate glass structure. Further, $P_2O_5$, $Na_2$, $K_2O$, and $Li_2O$ may impart improved cleanability and durability to glass compositions according to the embodiments.

That is, since the glass frit contains $P_2O_5$, $Na_2$, $K_2O$, and $Li_2O$, the functional layer can be easily cleaned by water when the functional layer formed by the glass composition according to the embodiment is contaminated by food or the like.

The group II-based oxide may contain at least one metal oxide of CaO and MgO. In detail, the group II-based oxide may contain CaO and MgO. In other words, the glass frit may contain both CaO and MgO.

The group II-based oxide may be contained in amount of about 15% or smaller by weight based on the total weight of the glass frit. In detail, the group II-based oxide may be contained in an amount from about 1% to about 15% by weight of the total weight of the glass frit. More specifically, the group I-based oxide may be contained in an amount of from about 5% to about 10% by weight of the total weight of the glass frit.

The group II-based oxide may be contained in the glass composition to improve the chemical composition of the glass composition.

If the group II-based oxide is contained at a smaller amount than about 1% by weight based on the total weight of the glass frit, the chemical composition of the glass composition may be degraded. Further, when the group II-based oxide is contained in an amount exceeding about 15% by weight based on the total weight of the glass frit, the cleaning performance of the glass composition may be degraded.

Each of the BaO and ZnO may be contained in an amount of about 30% or smaller by weight based on the total weight of the glass frit. In detail, each of the BaO and ZnO may be contained in an amount of about 2% to about 30% by weight based on the total weight of the glass frit. More specifically, each of the BaO and ZnO may be contained in an amount from about 7% to about 25% by weight based on the total weight of the glass frit.

The BaO and ZnO may be contained in the glass composition to strengthen the glass structure of the glass composition. The structure capable of maintaining the cleaning performance of the $P_2O_5$ may be continuously allowed using the BaO and ZnO. Further, the BaO may be contained in the glass composition to allow each composition contained in the glass composition to be uniformly dissolved. Further, the ZnO may function to appropriately adjust the surface tension of the coating film made of the glass composition.

If each of the BaO and ZnO is contained at an amount smaller than about 2% by weight based on the total weight of the glass frit, the glass structure of the glass composition may deteriorate and the durability and cleanability of the functional layer may be deteriorated. Further, when each of the BaO and ZnO is contained in an amount exceeding about 30% by weight based on the total weight of the glass frit, the BaO and ZnO may increase the hygroscopicity and make stable glass formation difficult.

The glass frit may further comprise $SiO_2$.

$SiO_2$ may be present at up to about 20 wt % based on the total weight of the glass frit. Specifically, $SiO_2$ may be present in an amount of from about 1 wt % to about 20 wt % based on the total weight of the glass frit. More specifically, $SiO_2$ may be present in an amount from about 6 wt % to about 15 wt % based on the total weight of the glass frit.

$SiO_2$ may be incorporated in the glass composition to form a glass structure of the glass composition, to improve the skeleton of the glass structure, and to improve the acid resistance of the glass frit. In particular, due to $SiO_2$, the glass composition may have improved acid resistance. Further, $SiO_2$ is contained in the glass composition to improve the water resistance. In other words, $SiO_2$ is contained in the glass composition, to prevent the functional layer formed of the glass composition from absorbing water.

If $SiO_2$ content is less than about 1 wt % based on the total weight of the glass frit, the glass structure of the glass composition may be degraded, resulting in a reduction in durability, acid resistance, and water resistance of the functional layer. Further, if $SiO_2$ is contained in an amount exceeding about 20 wt % based on the total weight of the glass frit, the cleanability of the glass frit may be lowered.

The glass frit may further comprise $B_2O_3$.

$B_2O_3$ may be present at up to about 10 wt % based on the total weight of the glass frit. Specifically, $B_2O_3$ may be present in an amount of about 0.1 wt % to about 10 wt % based on the total weight of the glass frit. More specifically, $B_2O_3$ may be contained at from about 3 wt % to about 7 wt %, based on the total weight of the glass frit.

$B_2O_3$ can enlarge the vitrification region of the glass frit and appropriately control the thermal expansion coefficient of the glass composition according to the embodiment. Further, B2O3 is contained in the glass composition, allowing each component contained in the glass composition to be dissolved uniformly prior to firing.

When $B_2O_3$ is contained at less than about 0.17 wt % based on the total weight of the glass frit, the vitrification area is reduced and thus the glass structure is degraded, thereby reducing the durability of the functional layer. Further, if $B_2O_3$ content is greater than about 10 wt % based on the total weight of the glass frit, the cleanability of the glass frit may be degraded.

The glass frit may further contain at least one of $Al_2O_3$ and $ZrO_2$. In one example, the glass frit may contain both of $Al_2O_3$ and $ZrO_2$.

$Al_2O_3$ and $ZrO_2$ may be present at up to about 20 wt % based on the total weight of the glass frit. Specifically, $A_2O_3$ and $ZrO_2$ may be present in an amount of about 1 wt % to about 20 wt % based on the total weight of the glass frit. More specifically, $Al_2O_3$ and $ZrO_2$ may be contained at from about 6 wt % to about 15 wt %, based on the total weight of the glass frit.

The Al2O3 is contained in the glass composition to improve the chemical durability of the glass composition. Heat resistance and surface hardness can be improved by the $Al_2O_3$.

Further, the $ZrO_2$ is contained in the glass composition, to improve the chemical durability of the glass composition.

If each of the $Al_2O_3$ and $ZrO_2$ is contained at an amount smaller than about 1% by weight based on the total weight the glass frit, the chemical resistance and durability of the glass composition may be reduced. Further, when each of the $Al_2O_3$ and $ZrO_2$ is contained in an amount of more than about 20% by weight based on the total weight of the glass frit, the cleaning performance of the glass frit may deteriorate, and the firing temperature and melt temperature rise, such that the adhesion may decrease, and the process efficiency can be reduced.

That is, $Al_2O_3$ and $ZrO_2$ may improve the chemical durability of the glass frit. In particular, $Al_2O_3$ and $ZrO_2$ may improve the chemical durability of the alkali phosphate glass structure formed by $P_2O_5$, $Na_2O$, $K_2O$ and $LiO_2$ via structural stabilization.

The glass frit may contain at least one of $TiO_2$ and SnO. For example, the glass frit may contain both $TiO_2$ and SnO.

Each of the $TiO_2$ and the SnO may be included in an amount of about 5% by weight or smaller with respect to the total glass frit weight. In detail, each of the $TiO_2$ and the SnO may be included in an amount of about 0.1 wt % to about 5 wt % with respect to the total glass frit weight. More specifically, each of the $TiO_2$ and the SnO may be included in an amount of about 1 wt % to about 4 wt % with respect to the total glass frit weight.

The SnO may function to appropriately adjust the surface tension of the coating film made of the glass composition, and improve the chemical resistance. Further, the $TiO_2$ can improve the hiding power of the glass composition according to the embodiment and improve the chemical resistance of the glass composition. That is, the $TiO_2$ can improve the hiding power of the coating layer of the glass composition coated as the functional layer.

If each of the $TiO_2$ and the SnO is included in a smaller content than about 0.1% by weight based on the total glass frit weight, the glass composition is reduced in the hiding power, such that the color of the base material or buffer layer may be visually recognized from outside when the glass composition is coated on the base material or buffer layer. Further, when each of the $TiO_2$ and the SnO is included in an amount of greater than about 5% by weight based on the total glass frit weight, the cleaning performance of the glass frit may be deteriorated.

The glass frit may further include at least one of $Co_3O_4$, NiO, $Fe_2O_3$ and $MnO_2$. In detail, the glass frit may include all of $Co_3O_4$, NiO, $Fe_2O_3$ and $MnO_2$.

The $Co_3O_4$, NiO, $Fe_2O_3$ and $MnO_2$ can improve the adhesion of the glass composition coated on the base. In other words, the $CO_3O_4$, NiO, $Fe_2O_3$ and $MnO_2$ can be an adhesion strengthening component that improves the adhesion when the glass composition containing the $Co_3O_4$, NiO, $Fe_2O_3$ and $MnO_2$ is coated on the buffer layer formed on the base.

For example, when forming the coating layer on a low carbon steel base, the adhesion enhancing component may react with the iron oxide of the base to improve adhesion between the coating layer and the base.

When placing the glass composition containing the $Co_3O_4$, NiO, $Fe_2O_3$ and $MnO_2$ on the buffer layer on the base, the adhesion between the buffer layer and the functional layer can be improved to improve the reliability.

The $Co_3O_4$, NiO, $Fe_2O_3$ and $MnO_2$ may be included in an amount of 1 to 5% by weight based on the total glass frit weight. More specifically, the $Co_3O_4$, NiO, $Fe_2O_3$ and $MnO_2$ may be included in an amount of about 2% to about 4% by weight based on the total glass frit weight.

Hereinafter, the present disclosure will be described in more detail based on glass composition manufacturing methods according to present embodiments and comparison examples. Those embodiments are merely an example to illustrate the present disclosure in more detail. Therefore, the present disclosure is not limited to those embodiments.

Present Example 1

The first and second glass frit materials was provided as in Table 1 below.

At this time, $NH_4H_2PO_4$ was used as the starting material for $P_2O_5$; $Na_2CO_3$, $K_2CO_3$ were used as starting materials for $Na_2O$, $K_2O$ respectively; $CaCO_3$, CaCO were used as starting materials for BaO and CaO, respectively; remaining components were the same as those shown in Table 1.

The first glass frit material may be a glass frit material to form a buffer layer disposed on the base. The second glass frit material may be a glass frit material to form the functional layer disposed on the buffer layer.

Then, after mixing the first glass frit materials, the mixture was melted at a temperature of about 1400° C. for about 1 hour to about 2 hours and then quenched in a quenching roller to obtain glass cullet.

Subsequently, about 0.1 wt % to about 1 wt % of organic polysiloxane was added to the glass cullet, followed by milling and grinding in a ball mill for about 4 hours to about 6 hours. The crushed cullet passes through a 325 mesh sieve. As a result, the first glass frits were formed to have a particle diameter of about 45 μm or less.

Then, the first glass frits were sprayed onto a low carbon steel sheet having a size of 200×200 mm and a thickness of 1 mm or less using a corona discharge gun. In this connection, the voltage of the corona discharge gun was controlled to 40 kV to 100 kV. The amount of glass frits sprayed on the low carbon steel sheet was 300 g/m2.

Then, the low carbon steel having the glass frits sprayed thereon was fired at a temperature of 830° C. to 870° C. for 300 seconds to 450 seconds to form a buffer layer on a face of the low carbon steel.

After the second glass frit material is mixed therewith, a second glass fit is formed in the same manner as in the formation of the first glass frit using the first glass frit material. Then, the functional layer was formed by coating the second glass frit on the buffer layer in the same process as in coating the buffer layer.

Present Example 2

The functional layer and the buffer layer was formed in the same manner as the Example 1 except second glass fit materials were provided as shown in Table 1 below.

Present Example 3

The functional layer and the buffer layer was formed in the same manner as the Example 1 except second glass frit materials were provided as shown in Table 1 below.

Present Example 4

The functional layer and the buffer layer was formed in the same manner as the Example 1 except second glass frit materials were provided as shown in Table 1 below.

Comparison Example

The functional layer and the buffer layer was formed in the same manner as the Example 1 except second glass frit materials were provided as shown in Table 1 below.

TABLE 1

| Composition (wt %) | first glass frit | second glass frit | | | | |
|---|---|---|---|---|---|---|
| | | Present Example 1 | Present Example 2 | Present Example 3 | Present Example 4 | Comparison example |
| $P_2O_5$ | — | 52.3 | 52.6 | 24.8 | 23.8 | 58.4 |
| $Na_2O$ | 15.0 | 1.9 | 1.9 | 6.6 | 6.3 | — |
| $K_2O$ | 10.7 | 4.8 | 4.7 | 11.5 | 11.0 | 4.9 |
| $Li_2O$ | 4.2 | — | — | — | — | — |
| BaO | — | 18.5 | 18.0 | 4.0 | 3.9 | — |
| ZnO | — | 1.0 | 0.9 | — | 7.1 | 4.0 |
| CaO | — | 2.9 | 2.8 | 0.7 | 1.0 | 5.1 |
| MgO | — | 8.8 | 8.6 | 0.3 | 0.5 | 19.0 |
| $SiO_2$ | 48.8 | 2.4 | 1.7 | 19.0 | 16.2 | 2.4 |
| $B_2O_3$ | 10.1 | 1.5 | 0.6 | 9.3 | 8.3 | — |
| $Al_2O_3$ | — | 1.0 | 2.9 | 17.1 | 15.2 | 4.2 |

TABLE 1-continued

|  |  | second glass frit | | | | |
| --- | --- | --- | --- | --- | --- | --- |
| Composition (wt %) | first glass frit | Present Example 1 | Present Example 2 | Present Example 3 | Present Example 4 | Comparison example |
| $ZrO_2$ | — | 1.0 | 1.0 | 2.7 | 2.4 | — |
| SNO | — | — | — | 1.0 | 1.0 | — |
| $TiO_2$ | 2.4 | 1.9 | 1.9 | — | — | — |
| $CO_3O_4$ | 1.0 | 1.0 | 1.4 | 2.0 | 2.0 | 1.2 |
| NiO | 0.5 | — | 0.5 | — | — | — |
| $Fe_2O_3$ | 0.8 | 1.0 | — | 1.0 | 1.0 | 0.8 |
| $MnO_2$ | 0.5 | — | 0.5 | — | 0.3 | — |
| NaF | 6.0 | — | — | — | — | — |

The applicants then proceeded to characterize the functional layers fabricated by the embodiments and comparison examples.

The softening points (Td) and the thermal expansion coefficients of the functional layers were measured, and the cleanability of each functional layer was measured by the cleanability test.

In order to measure the thermal properties of the glass, the pellet specimen was fired under the same conditions as those of the. After polishing both surfaces of the specimen in parallel with each other, the Td (softening point) and CTE (thermal expansion coefficient) were measured using a TMA (Thermo Mechanical Analyzer) at a temperature increase rate of 10° C./min.

Further, the cleanability was measured by applying a 1 g of chicken oil as a contaminant on the surface of the enamel-coated test body (200×200) mm using a brush. Thereafter, the test body to which the contaminant was applied was placed in a thermostat, and the contaminants were fixed to the body at a temperature of about 250 degree C. and for 1 hour.

After the fixation, the test body was caused to cool naturally, and then the degree of curing thereof was confirmed. Then, the test body was immersed in a water bath at 70° C. for 10 seconds to 10 minutes. Thereafter, the cured chicken oil and a cheery pie filling as sugar ingredients were wiped out with a wet cloth at a force of 3 kgf or less. A 5 cm-diameter bottom-flatted rod was used to homogenize the wiped area in the contaminated enamel surface. At this time, the number of wiping reciprocations as shown in Table 2 was measured and defined as the cleaning frequency. The evaluation indexes thereof were as shown in Table 3 and Table 4 below.

TABLE 2

| wiping frequency | performance Level |
| --- | --- |
| equal to or smaller than 5 | 5 |
| equal to or smaller than 15 | 4 |
| equal to or smaller than 25 | 3 |
| equal to or smaller than 50 | 2 |
| larger than 50 | 1 |

TABLE 3

|  | Softening point (° C.) | Thermal expansion coefficient (×$10^{-7}$/° C.) |
| --- | --- | --- |
| Example 1 | 538.1 | 107.6 |
| Example 2 | 533.4 | 107.2 |
| Example 3 | 502.7 | 117.2 |
| Example 4 | 526.3 | 116.1 |
| Comparison example | 562.3 | 93.3 |

TABLE 4

|  | Example 1 | Example 2 | Example 3 | Example 4 | Comparison example |
| --- | --- | --- | --- | --- | --- |
| cleanability | 5 | 5 | 5 | 5 | 1 |

Referring to Table 3, it may be seen that the functional layers produced by the glass frits according to the Example 1 to Example 4 have a high softening point and thermal expansion coefficient. That is, the functional layers produced by the glass frits of the Example 1 to Example 4 has a softening point of about 500° C. or higher and a thermal expansion coefficient of about 100 ($10^{-7}$/° C.) or more.

That is, it may be seen that the functional layers formed by the glass frits according to the Example 1 to Example 4 have improved durabilty and chemical resistance.

Further, referring to Table 4, it may be seen that the functional layers formed by the glass frits according to the Example 1 to Example 4 have improved cleanability compared to the functional layers formed by the glass frits according to the comparison example.

According to the present disclosure, the glass composition may have improved cleanability.

Accordingly, the cleaning of the cooking appliance may be improved. In detail, the cooking appliance can be easily cleaned only with water-soaking.

That is, although the inner face of the door and the inner face of the cavity portion are contaminated by food and organic substances generated during the cooking process while the cooking space defined in the cavity portion of the cooking appliance is closed, the inner face of the door and the inner face of the cavity portion may be easily cleaned only with the water-soaking.

Further, since the functional layer coated using the glass composition according to the embodiment is excellent in cleaning property, the interior of the cooking appliance can be easily cleaned even with a small energy.

Further, since the glass composition according to the embodiment has a softening point and thermal expansion coefficient higher than a certain temperature, the function face may withstand cooking and washing at a high temperature for a long time.

While the embodiments have been described above, the present disclosure is not intended to limit the embodiments. Those skilled in the art will recognize that various changes and modifications may be possible without departing from the essential characteristics of the present invention. For example, each component specifically illustrated in the embodiment may be modified. It is also to be understood that the various modifications and variations are intended to be included within the scope of the present disclosure as defined in the appended claims.

What is claimed is:

1. A glass composition comprising a glass frit containing Phosphorus Pentoxide ($P_2O_5$), Barium Oxide (BaO), Zinc Oxide (ZnO), Silicon Dioxide ($SiO_2$), Boron Oxide ($B_2O_3$), Aluminum Oxide ($Al_2O_3$), Zirconium Dioxide ($ZrO_2$), Stannous Oxide (SnO), Titanium Dioxide ($TiO_2$), Calcium oxide (CaO), Magnesium Oxide (MgO) and group I-based oxide, wherein the $P_2O_5$ is contained in an amount of 20 wt % to 55 wt % based on a total weight of the glass frit, wherein each of the BaO and ZnO is contained in an amount of 2 to 30% by weight based on the total weight of the glass frit, wherein the group I-based oxide is contained in an amount of 5 to 20% by weight based on the total weight of the glass frit, wherein the Calcium oxide (CaO) and Magnesium oxide (MgO) is contained in an amount of 1 to 15% by weight based on the total weight of the glass frit, wherein the $SiO_2$ is contained in an amount of 1 to 20% by weight based on the total weight of the glass frit, wherein the $B_2O_3$ is contained in an amount of 0.1 wt % to 10 wt % based on the total weight of the glass frit, wherein each of the $Al_2O_3$ and $ZrO_2$ is contained in an amount of 1 wt % to 20 wt % based on the total weight of the glass frit, and wherein each of the SnO and $TiO_2$ is contained in an amount of 0.1 wt % to 5 wt % based on the total weight of the glass frit.

2. The glass composition of claim 1, wherein the group I-based oxide includes at least one of $Na_2O$ and $K_2O$.

3. The glass composition of claim 1, wherein the glass frit further contains an adhesion enhancing component, wherein the adhesion enhancing component is contained in an amount of 0.1% to 5% by weight relative to the total weight of the glass frit, wherein the adhesion enhancing component includes at least one metal oxide selected from $Co_3O_4$, NiO, $Fe_2O_3$ and $MnO_2$.

\* \* \* \* \*